Feb. 6, 1962    L. J. BISHOP ETAL    3,019,741
SWITCH STRUCTURE FOR CONVEYOR SYSTEM
Original Filed Oct. 30, 1956
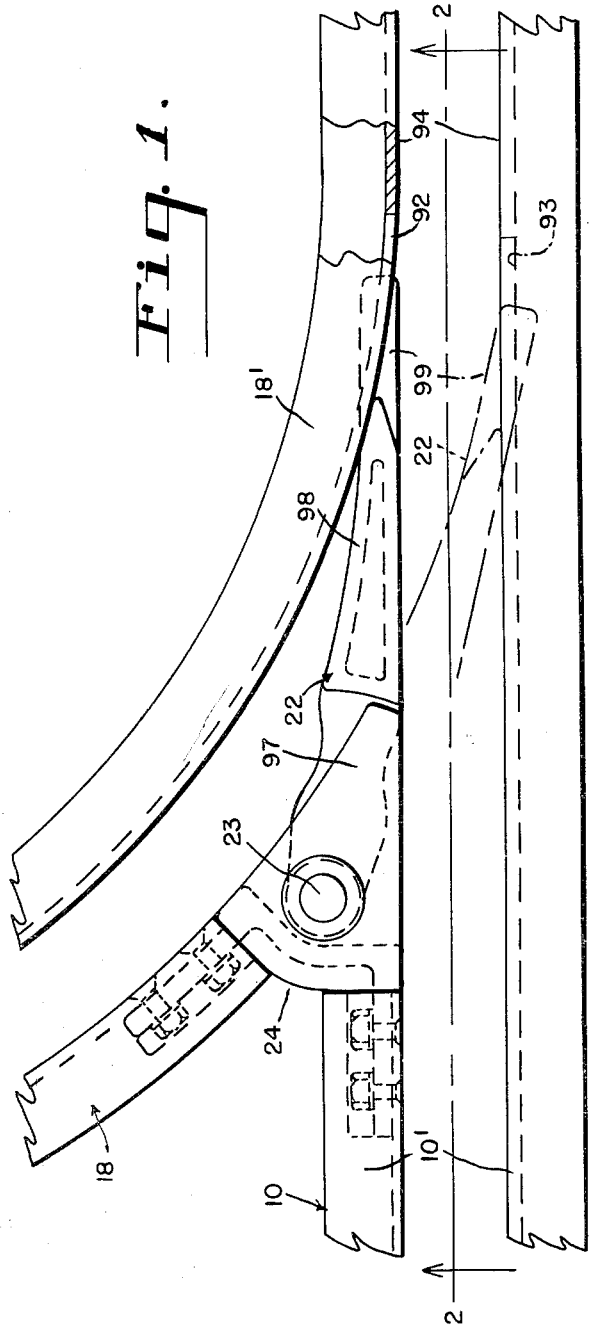
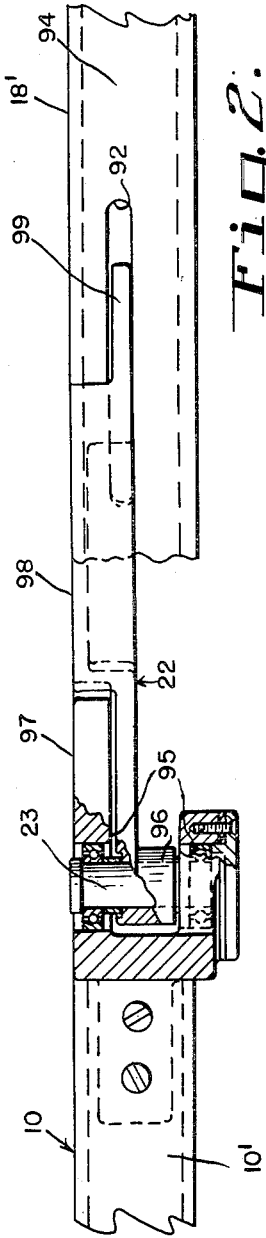
INVENTORS.
LEONARD J. BISHOP
JOEL H. BARLOW.
BY Whittemore, Hulbert &
Belknap
ATTORNEYS United States Patent Office 3,019,741
Patented Feb. 6, 1962

3,019,741
SWITCH STRUCTURE FOR CONVEYOR SYSTEM
Leonard J. Bishop, Birmingham, and Joel H. Barlow, Detroit, Mich., assignors to Mechanical Handling Systems, Inc., Detroit, Mich., a corporation of Michigan
Original application Oct. 30, 1956, Ser. No. 619,249, now Patent No. 2,875,703, dated Mar. 3, 1959. Divided and this application Jan. 12, 1959, Ser. No. 786,133
3 Claims. (Cl. 104—104)

The present invention relates to an improved power and free type conveyor system such as is illustrated and described in the copending applications of Leonard J. Bishop and Paul Klamp, Serial No. 513,542, filed June 6, 1955 (now U.S. Letters Patent No. 2,868,138 of January 13, 1959, and Leonard J. Bishop and Joel H. Barlow, Serial No. 619,249, filed October 30, 1956 (now U.S. Letters Patent No. 2,875,703 of March 3, 1959), of which last named application the present application is a division.

It is a general object of the invention to provide a switch mechanism for a conveyor system of the overhead type, preferably in which a load trolley traversing one overhead track is transferred onto another track by a continuously traveling transfer chain adjacent the junction of the two tracks. In an installation of this sort a power driven trolley itself serves to shift the improved switch of the invention to or from a switching position, and the movable switch bears the considerable weight of the loaded trolley in traversing the switch zone.

As illustrated in our Patent No. 2,875,703, the improved switch structure is located at the junction of a branch or free conveyor track and a main line or power conveyor track, and therefore may be designated a re-entry or entrance switch to the latter. However, and as will be evident to those skilled in the art, the switch is also well adapted for use at an exit point to guide and sustain the load of trolleys switched from a main or power line to a branch or free track, under appropriate signal from an advance point; and the copending application of Paul Klamp, Serial No. 601,001 (now U.S. Letters Patent No. 2,868,139 of January 13, 1959) illustrates and describes a typical power and free exit switch installation of this sort.

Another general object of the invention is to provide a switch and transfer mechanism of the sort described above, in which all operating, control and operated components are mechanical in nature, being extremely rugged, as well as reliable and foolproof, so as to require little or no attention. A system of this sort is very economically produced and installed, as compared with pneumatically, hydraulically and electrically operated installations, in addition to being reliable and foolproof, as pointed out above.

A still further and more specific object is to provide a switch structure, particularly one including a switch tongue operated by trolley supporting the loaded trolleys in their travel along one track or from one track to another, in which the togue has improved provisions to bear the weight of the trolleys in their traverse of the tongue, whether switched by the latter or not.

A further specific object is to provide a switch structure including a switch tongue movable mechanically by the trolleys from a straight through position to a trolley switching position, or vice versa, in which structure an extension of the switch tongue is receivable in recesses beneath the load bearing surfaces of adjacent fixed track members, in said respective positions of the tongue, and is vertically supported rigidly by said respective members to sustain the weight of the trolley traversing the tongue.

Yet another object is to provide switching structure as described in which the tongue is moved to and from switching position by means of a vertically journalled guide roller depending from the trolleys and traveling between vertical track webs, in certain of which the recesses to receive and vertically support the switch tongue extension are formed.

The foregoing as well as other objects will become more apparent as this description proceeds, especially when considered in connection with the accompanying drawings illustrating the invention, wherein:

FIG. 1 is a fragmentary top plan view, partially broken away and horizontally sectioned, of the improved switch structure of the invention; and FIG. 2 is a fragmentary view in side elevation, also partially broken away and in vertical section, of the structure of FIG. 1, the view being from line 2—2 of that figure.

The reference numeral 10 generally designates a main trolley supporting track reach of an overhead conveyor system of the power and free type, such as forms the subject matter of our Patent No. 2,875,703, identified above, while the reference numeral 18 designates a transfer section of curved track structure by which a branch track (not shown) is connected with the main track 10. All of these provisions are appropriately supported by horizontal and vertical beams (not shown) of the overhead conveyor mounting structure, which is conventional.

A swinging entrance switch tongue or frog 22 is mounted on a vertical pivot 23 at a cast connector 24 located at the junction of the respective main and switch track portions 10 and 18, to which connector the respective tracks are bolted. In accordance with the present invention, provisions are made for sustaining without deflection the weight of a loaded trolley traversing the tongue 22 at the switch zone, whether the latter is in the straight through position illustrated in FIG. 1, in which track 10 is open across the switch zone, or in its other position, in which the switch transfer track 18 opens to the main track. Main track portion 10 is constituted by a pair of transversely spaced, parallel track members 10′ of angle iron or channel-shaped cross section, the top horizontal flanges of which provide a load bearing surface for the wheels of a conventional load trolley (not shown). Similarly, the arcuate switch track portion 18 comprises track members 18′ of similar angle iron or channel section having top horizontal load surfaces coplanar with those of track members 10′.

It is seen by reference to FIGS. 1 and 2 that the inner track member 18′ of the arcuate track segment 18 and the outer track section 10′ adjacent the switch are provided with elongated horizontal apertures 92, 93, respectively, opening through the sides of their mutually facing vertical web portions 94, i.e., beneath the continuous horizontal, load bearing top flanges thereof. The switch tongue 22 is pivoted, at 23, to the generally triangular connector casting 24 by means of vertically spaced ball bearings 95 and the tongue 22 is connected by an integral hub 96 to the pivot 23 which turns in these bearings, being received in a forwardly opening forked recess of the connector 24. Forwardly of the convergent-sided nose 97 of the connector, and horizontally flush therewith, the tongue 22 has an upwardly offset, elongated surface 98 which constitutes a trolley bearing track surface of the tongue. The tongue is then offset downwardly from the surface, terminating in a downwardly offset extension or bearing nose 99 which extends substantially forwardly of the surface 98. The lower edge of the bearing extension or nose 99 is in the horizontal plane of the bottom of the elongated, horizontally opening track section slots or apertures 92, 93, and is receivable in these slots in the alternate positions of the switch tongue 22, as shown in FIGS. 1 and 2.

Vertical support is therefore given to the tongue 22, in its solid line position of FIG. 1, in sustaining the trolley as its load bearing rollers (not shown) pass from the main track members 10' across the tongue track surface 98 and continue on along the main track. Thus the bearings at the pivot 23 are not unduly stressed, and a smooth traverse of the trolley along the track switch zone results. A similarly smooth traverse occurs as the trolley passes from arcuate portion 18 across tongue 22 onto the main track. All load bearing surfaces are smooth and uninterrupted.

In operation the trolleys positively move the switch tongue 22 from its straight through position (solid lines in FIG. 1) to its switching position (dotted lines), by engagement with the tongue in passing the latter. As thus shifted, the tongue extension 99 passes into the slot 93 of outer track member 10' beneath its top, load supporting surface, and sustains the weight of the trolley as its load rollers travel along the top of tongue surface 98. The same action occurs as a trolley is driven down the main track 10 into the switch zone. It engages and shifts tongue from switching to straight-through position and the trolley and load weight are sustained in this instance by track member 18', in a zone beneath the load supporting surface of the latter.

The transition is made smoothly and without bumping, due to the substantial continuity of horizontal, upper track and tongue surface at the switch zone, and bearings are relieved of improper stress. The tongue and its load are sustained in slots 92, 93 in the sides of the tracks, against which sides the top load supporting surface of the tongue has side abutment (see FIG. 1). These slots therefore do not offer a place for the accumulation of foreign matter such as might prevent a full swing of the tongue to either of its two positions. Further, the top, roller and load supporting surface of the tracks is smooth and uninterrupted at the switch zone.

What we claim as our invention is:

1. Load bearing track switch structure, comprising fixed track means including a pair of first load bearing tracks in angular, generally meeting relation to one another at a switch zone to support load units traveling at one side of said zone, said tracks comprising converging pairs of track members each having a portion providing a horizontal load supporting surface, a given track member of each pair having a further portion extending downwardly of said surface, a further load bearing track on the other side of said switch zone having portions providing horizontal load supporting surfaces substantially coplanar with those of said first track, and a switch movable in said switch zone to and from positions to connect the load supporting surfaces of the given track members of one or the other of said first tracks with said surfaces of said further track, said switch having a load supporting surface generally coplanar with said load supporting surfaces of said track members and said further track, on which switch surface said load units travel in traversing said switch zone, said switch being adapted for side abutting engagement with the respective downwardly extending portions of said given track members in said respective connecting positions of the switch, the switch being provided with a supporting member spaced beneath and laterally exposed horizontally below said load supporting surface of the switch, said given track members of said first tracks each having an opening in said depending further portion thereof beneath the respective horizontal load supporting surfaces thereof, said last named surfaces extending over said respective openings, said supporting member of the switch being horizontally receivable in the respective openings with the switch laterally abutting one or the other of said first given load bearing track members and with the load supporting surface of the switch providing a flush continuation of a load supporting surface of the abutted track, said depending portions of said given track members sustaining said supporting member from beneath in either of said positions of the switch.

2. Load bearing track switch structure, comprising fixed track means including a pair of first load bearing tracks in angular, generally meeting relation to one another at a switch zone to support load units traveling at one side of said zone, said tracks comprising converging pairs of track members each having a portion providing a horizontal load supporting surface, a given track member of each pair having a further portion extending downwardly of said surface, a further load bearing track on the other side of said switch zone having portions providing horizontal load supporting surfaces substantially coplanar with those of said first track, and a switch movable in said switch zone to and from positions to connect the load supporting surfaces of the given track members of one or the other of said first tracks with said surfaces of said further track, said switch having a load supporting surface generally coplanar with said load supporting surfaces of said track members and said further track, on which switch surface of said load units travel in traversing said switch zone, said switch being provided with a supporting member adapted for side abutting engagement with the respective downwardly extending portions of said given track members in said respective connecting positions of the switch, the switch being provided with a supporting member spaced beneath and laterally exposed horizontally below said load supporting surface of the switch, said given track members of said first tracks each having an aperture opening horizontally through said depending further portion thereof beneath the respective horizontal load supporting surfaces thereof, said last named surfaces extending over said respective apertures, said supporting member of the switch being horizontally receivable in the respective apertures with the switch laterally abutting one or the other of said first given load bearing track members and with the load supporting surface of the switch providing a flush continuation of a load supporting surface of the abutted track, said depending portions of said given track members sustaining said supporting member from beneath in either of said load positions of the switch.

3. Load bearing track switch structure, comprising fixed track means including a pair of first load bearing tracks in angular, generally meeting relation to one another at a switch zone to support load units traveling at one side of said zone, said tracks comprising converging pairs of track members each having a portion providing a horizontal load supporting surface, a given track member of each pair having a further portion extending downwardly of said surface, a further load bearing track on the other side of said switch zone having portions providing horizontal load supporting surfaces substantially coplanar with those of said first track, and a switch movable in said switch zone to and from positions to connect the load supporting surfaces of the given track members of one or the other of said first tracks with said surfaces of said further track, said switch having a load supporting surface generally coplanar with said load supporting surfaces of said track members and said further track, on which switch surface of said load units travel in traversing said switch zone, said switch having a terminal portion adapted for side abutting engagement with the respective downwardly extending portions of said given track members in said respective connecting positions of the switch, the switch being provided with a supporting member spaced beneath and forwardly exposed horizontally below said terminal portion and load supporting surface of the switch, said given track member of said first tracks each having an aperture opening horizontally through said depending further portion thereof beneath the respective horizontal load supporting surfaces thereof, said last named surfaces extending over said respective apertures, said supporting member of the switch being horizontally receivable in the respective apertures with the switch laterally abutting one or the other of said first given load bearing track members and with the load supporting surface of the switch providing a flush continuation of a load supporting surface of the abutted track, said depending portions of said given track members sustaining said supporting member from beneath in either of said positions of the switch.

References Cited in the file of this patent

UNITED STATES PATENTS

| | | |
|---|---|---|
| 1,305,415 | Steffens | June 3, 1919 |
| 2,868,138 | Bishop et al. | Jan. 13, 1959 |
| 2,875,703 | Bishop et al. | Mar. 3, 1959 |

FOREIGN PATENTS

| | | |
|---|---|---|
| 422,696 | France | Jan. 26, 1911 |
| 600,717 | France | Nov. 14, 1925 |